(12) United States Patent
Von Novak et al.

(10) Patent No.: US 9,136,914 B2
(45) Date of Patent: Sep. 15, 2015

(54) IMPEDANCE CHANGE DETECTION IN WIRELESS POWER TRANSMISSION

(75) Inventors: William H Von Novak, San Diego, CA (US); Stanley S Toncich, San Diego, CA (US); Roberto Rimini, San Diego, CA (US); Kevin D Lee, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 1256 days.

(21) Appl. No.: 12/641,219

(22) Filed: Dec. 17, 2009

(65) Prior Publication Data

US 2010/0217553 A1 Aug. 26, 2010

Related U.S. Application Data

(60) Provisional application No. 61/146,584, filed on Jan. 22, 2009, provisional application No. 61/151,473, filed on Feb. 10, 2009, provisional application No. 61/177,148, filed on May 11, 2009.

(51) Int. Cl.
| | |
|---|---|
| *H01F 27/42* | (2006.01) |
| *H01F 37/00* | (2006.01) |
| *H01F 38/00* | (2006.01) |
| *H04B 5/00* | (2006.01) |
| *G06K 7/00* | (2006.01) |

(52) U.S. Cl.
CPC ............ *H04B 5/0056* (2013.01); *G06K 7/0008* (2013.01)

(58) Field of Classification Search
USPC .............................. 307/104; 455/91, 107, 108
See application file for complete search history.

(56) References Cited

U.S. PATENT DOCUMENTS 6,664,770 B1 * 12/2003 Bartels ........................ 323/222
8,004,118 B2 * 8/2011 Kamijo et al. ................ 307/104
(Continued)

FOREIGN PATENT DOCUMENTS

| CN | 1224942 A | 8/1999 |
|---|---|---|
| EP | 1615158 A2 | 1/2006 |

(Continued)

OTHER PUBLICATIONS

Finding the distance between two points.*
(Continued)

*Primary Examiner* — Rexford Barnie
*Assistant Examiner* — Rasem Mourad
(74) *Attorney, Agent, or Firm* — Knobbe Martens Olson & Bear, LLP

(57) ABSTRACT

Exemplary embodiments are directed to wireless power transfer. Energy from a transmit antenna is coupled to internal signals on a transmitter. An impedance measurement circuit generates an impedance indication signal for indicating an impedance difference between the coupled internal signals by comparing them. A controller samples the impedance indication signal and determines digital signaling values responsive to changes in the impedance indication signal. The impedance measurement circuit measures one or more of magnitude difference of the internal signals, phase difference of the internal signals, and changes in power consumed by an amplifier coupled between the RF signal and the transmit antenna. A transmitter generates the electromagnetic field with a transmit antenna responsive to a Radio Frequency (RF) signal to create a coupling-mode region within a near field of the transmit antenna.

43 Claims, 10 Drawing Sheets

(56) References Cited

U.S. PATENT DOCUMENTS

| | | |
|---|---|---|
| 2002/0117368 A1 | 8/2002 | Ogasawara |
| 2004/0100330 A1* | 5/2004 | Chandler ............... 330/305 |
| 2006/0025088 A1* | 2/2006 | Pietig et al. ............. 455/121 |
| 2007/0173214 A1 | 7/2007 | Mickle et al. |
| 2008/0186032 A1* | 8/2008 | Van Bezooijen et al. ..... 324/646 |
| 2009/0284218 A1 | 11/2009 | Mohammadian et al. |
| 2009/0284369 A1 | 11/2009 | Toncich et al. |
| 2009/0286475 A1 | 11/2009 | Toncich et al. |
| 2009/0286476 A1 | 11/2009 | Toncich et al. |
| 2010/0261442 A1* | 10/2010 | Paculdo ............... 455/110 |

FOREIGN PATENT DOCUMENTS

| | | |
|---|---|---|
| EP | 1615158 A2 * | 1/2006 |
| EP | 2091126 A1 | 8/2009 |
| EP | 2091126 A1 * | 8/2009 |
| JP | 2001036311 A | 2/2001 |
| JP | 2005208754 A | 8/2005 |
| JP | 2005527167 A | 9/2005 |
| JP | 2006230032 A | 8/2006 |
| JP | 2008141816 A | 6/2008 |
| JP | 2009501000 A | 1/2009 |
| WO | 03100904 A1 | 12/2003 |
| WO | WO2008066110 A1 | 6/2008 |

OTHER PUBLICATIONS

Takaishi (EP 2091126 A1).*
Deguchi (EP 1615158).*
Takaishi (EP 2091126).*
Chemeketa.edu (Finding the Distance between Two Points).*
International Search Report PCT/US10/021876, International Search Authority European Patent Office Apr. 28, 2010.
Written Opinion—PCT/US2010/021876—ISA/EPO—Apr. 28, 2010.

* cited by examiner

IMPEDANCE CHANGE DETECTION IN WIRELESS POWER TRANSMISSION

CLAIM OF PRIORITY UNDER 35 U.S.C. §119

This application claims priority under 35 U.S.C. §119(e) to:

U.S. Provisional Patent Application 61/146,584 entitled "SIGNALING BETWEEN WIRELESS POWER RECEIVERS AND TRANSMITTERS" filed on Jan. 22, 2009.

U.S. Provisional Patent Application 61/151,473 entitled "SIGNALING TECHNIQUES FOR A WIRELESS CHARGING SYSTEMS" filed on Feb. 10, 2009.

U.S. Provisional Patent Application 61/177,148 entitled "IMPEDANCE CHANGE DETECTION FOR WIRELESS POWER" filed on May 11, 2009.

BACKGROUND

1. Field

The present invention relates generally to wireless charging, and more specifically to devices, systems, and methods related to detecting impedance changes in a transmitter device due to receiver devices that may be located in wireless power systems.

2. Background

Typically, each battery powered device such as a wireless electronic device requires its own charger and power source, which is usually an alternating current (AC) power outlet. Such a wired configuration becomes unwieldy when many devices need charging.

Approaches are being developed that use over-the-air or wireless power transmission between a transmitter and a receiver coupled to the electronic device to be charged. Such approaches generally fall into two categories. One is based on the coupling of plane wave radiation (also called far-field radiation) between a transmit antenna and a receive antenna on the device to be charged. The receive antenna collects the radiated power and rectifies it for charging the battery. Antennas are generally of resonant length in order to improve the coupling efficiency. This approach suffers from the fact that the power coupling falls off quickly with distance between the antennas, so charging over reasonable distances (e.g., less than 1 to 2 meters) becomes difficult. Additionally, since the transmitting system radiates plane waves, unintentional radiation can interfere with other systems if not properly controlled through filtering.

Other approaches to wireless energy transmission techniques are based on inductive coupling between a transmit antenna embedded, for example, in a "charging" mat or surface and a receive antenna (plus a rectifying circuit) embedded in the electronic device to be charged. This approach has the disadvantage that the spacing between transmit and receive antennas must be very close (e.g., within millimeters). Though this approach does have the capability to simultaneously charge multiple devices in the same area, this area is typically very small and requires the user to accurately locate the devices to a specific area.

Efficiency is of importance in a wireless power transfer system due to the losses occurring in the course of wireless transmission of power. Since wireless power transmission is often less efficient than wired transfer, efficiency is of an even greater concern in a wireless power transfer environment.

As a result, when attempting to provide power to one or more charging devices, there is a need for the devices to be charged to communicate with the wireless power transmitter. In addition, there is a need for methods and apparatuses for adapting to impedance changes occurring at the transmitter due to receiver impedance changes.

DETAILED DESCRIPTION

The word "exemplary" is used herein to mean "serving as an example, instance, or illustration." Any embodiment described herein as "exemplary" is not necessarily to be construed as preferred or advantageous over other embodiments.

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

The words "wireless power" is used herein to mean any form of energy associated with electric fields, magnetic fields, electromagnetic fields, or otherwise that is transmitted between from a transmitter to a receiver without the use of physical electromagnetic conductors.

Figure 1:
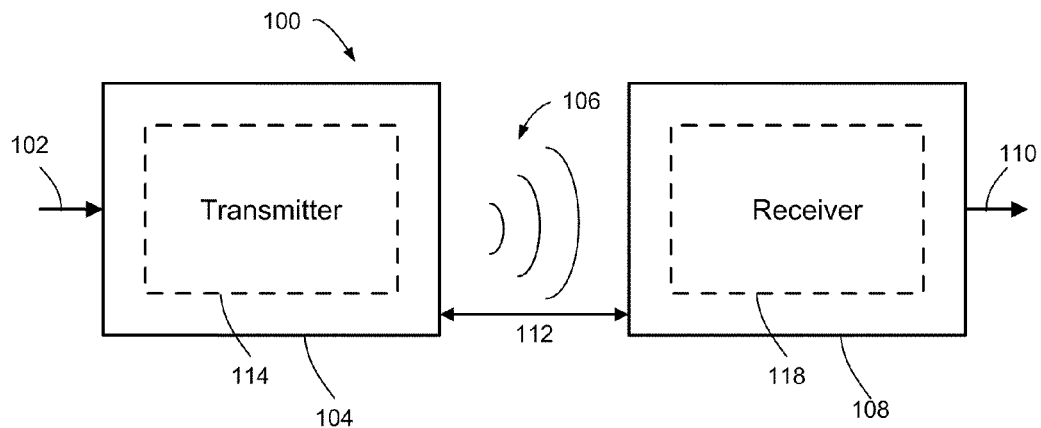
FIG. 1 shows a simplified block diagram of a wireless power transfer system.

FIG. 1 illustrates a wireless transmission or charging system 100, in accordance with various exemplary embodiments of the present invention. Input power 102 is provided to a transmitter 104 for generating a radiated field 106 for providing energy transfer. A receiver 108 couples to the radiated field 106 and generates an output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship and when the resonant frequency of receiver 108 and the resonant frequency of transmitter 104 are very close, transmission losses between the transmitter 104 and the receiver 108 are minimal when the receiver 108 is located in the "near-field" of the radiated field 106.

Transmitter 104 further includes a transmit antenna 114 for providing a means for energy transmission and receiver 108 further includes a receive antenna 118 for providing a means for energy reception. The transmit and receive antennas are sized according to applications and devices to be associated therewith. As stated, an efficient energy transfer occurs by coupling a large portion of the energy in the near-field of the transmitting antenna to a receiving antenna rather than propagating most of the energy in an electromagnetic wave to the far field. When in this near-field a coupling mode may be developed between the transmit antenna 114 and the receive antenna 118. The area around the antennas 114 and 118 where this near-field coupling may occur is referred to herein as a coupling-mode region.

Figure 2:
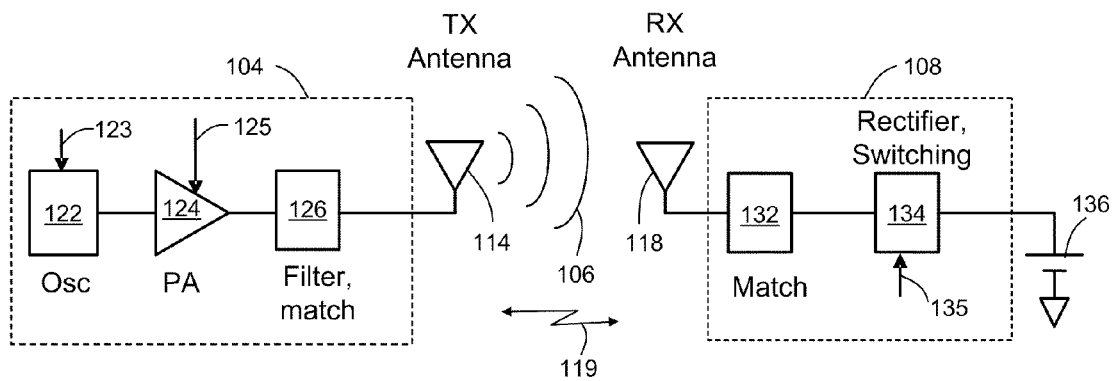
FIG. 2 shows a simplified schematic diagram of a wireless power transfer system.

FIG. 2 shows a simplified schematic diagram of a wireless power transfer system. The transmitter 104 includes an oscillator 122, a power amplifier 124 and a filter and matching circuit 126. The oscillator is configured to generate a desired frequency, which may be adjusted in response to adjustment signal 123. The oscillator signal may be amplified by the power amplifier 124 with an amplification amount responsive to control signal 125. The filter and matching circuit 126 may be included to filter out harmonics or other unwanted frequencies and match the impedance of the transmitter 104 to the transmit antenna 114.

The receiver 108 may include a matching circuit 132 and a rectifier and switching circuit 134 to generate a DC power output to charge a battery 136 as shown in FIG. 2 or power a device coupled to the receiver (not shown). The matching circuit 132 may be included to match the impedance of the receiver 108 to the receive antenna 118. The receiver 108 and transmitter 104 may communicate on a separate communication channel 119 (e.g., Bluetooth, zigbee, cellular, etc).

Figure 3:
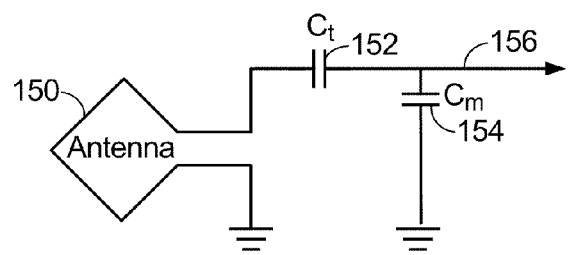
FIG. 3 shows a schematic diagram of a loop antenna for use in exemplary embodiments of the present invention.

As illustrated in FIG. 3, antennas used in exemplary embodiments may be configured as a "loop" antenna 150, which may also be referred to herein as a "magnetic" antenna. Loop antennas may be configured to include an air core or a physical core such as a ferrite core. Air core loop antennas may be more tolerable to extraneous physical devices placed in the vicinity of the core. Furthermore, an air core loop antenna allows the placement of other components within the core area. In addition, an air core loop may more readily enable placement of the receive antenna 118 (FIG. 2) within a plane of the transmit antenna 114 (FIG. 2) where the coupled-mode region of the transmit antenna 114 (FIG. 2) may be more powerful.

As stated, efficient transfer of energy between the transmitter 104 and receiver 108 occurs during matched or nearly matched resonance between the transmitter 104 and the receiver 108. However, even when resonance between the transmitter 104 and receiver 108 are not matched, energy may be transferred at a lower efficiency. Transfer of energy occurs by coupling energy from the near-field of the transmitting antenna to the receiving antenna residing in the neighborhood where this near-field is established rather than propagating the energy from the transmitting antenna into free space.

The resonant frequency of the loop or magnetic antennas is based on the inductance and capacitance. Inductance in a loop antenna is generally simply the inductance created by the loop, whereas, capacitance is generally added to the loop antenna's inductance to create a resonant structure at a desired resonant frequency. As a non-limiting example, capacitor 152 and capacitor 154 may be added to the antenna to create a resonant circuit that generates resonant signal 156. Accordingly, for larger diameter loop antennas, the size of capacitance needed to induce resonance decreases as the diameter or inductance of the loop increases. Furthermore, as the diameter of the loop or magnetic antenna increases, the efficient energy transfer area of the near-field increases. Of course, other resonant circuits are possible. As another non-limiting example, a capacitor may be placed in parallel between the two terminals of the loop antenna. In addition, those of ordinary skill in the art will recognize that for transmit antennas the resonant signal 156 may be an input to the loop antenna 150.

Exemplary embodiments of the invention include coupling power between two antennas that are in the near-fields of each other. As stated, the near-field is an area around the antenna in which electromagnetic fields exist but may not propagate or radiate away from the antenna. They are typically confined to a volume that is near the physical volume of the antenna. In the exemplary embodiments of the invention, magnetic type antennas such as single and multi-turn loop antennas are used for both transmit (Tx) and receive (Rx) antenna systems since magnetic near-field amplitudes tend to be higher for magnetic type antennas in comparison to the electric near-fields of an electric-type antenna (e.g., a small dipole). This allows for potentially higher coupling between the pair. Furthermore, "electric" antennas (e.g., dipoles and monopoles) or a combination of magnetic and electric antennas is also contemplated.

The Tx antenna can be operated at a frequency that is low enough and with an antenna size that is large enough to achieve good coupling (e.g., >−4 dB) to a small receive antenna at significantly larger distances than allowed by far field and inductive approaches mentioned earlier. If the Tx antenna is sized correctly, high coupling levels (e.g., −1 to −4 dB) can be achieved when the receive antenna on a host device is placed within a coupling-mode region (i.e., in the near-field) of the driven Tx loop antenna.

Furthermore, exemplary embodiments may also include approaches to wireless energy transmission techniques that are based on inductive coupling between a transmit antenna embedded, for example, in a "charging" mat or surface and a receive antenna (plus a rectifying circuit) embedded in the electronic device to be charged.

Figure 4:
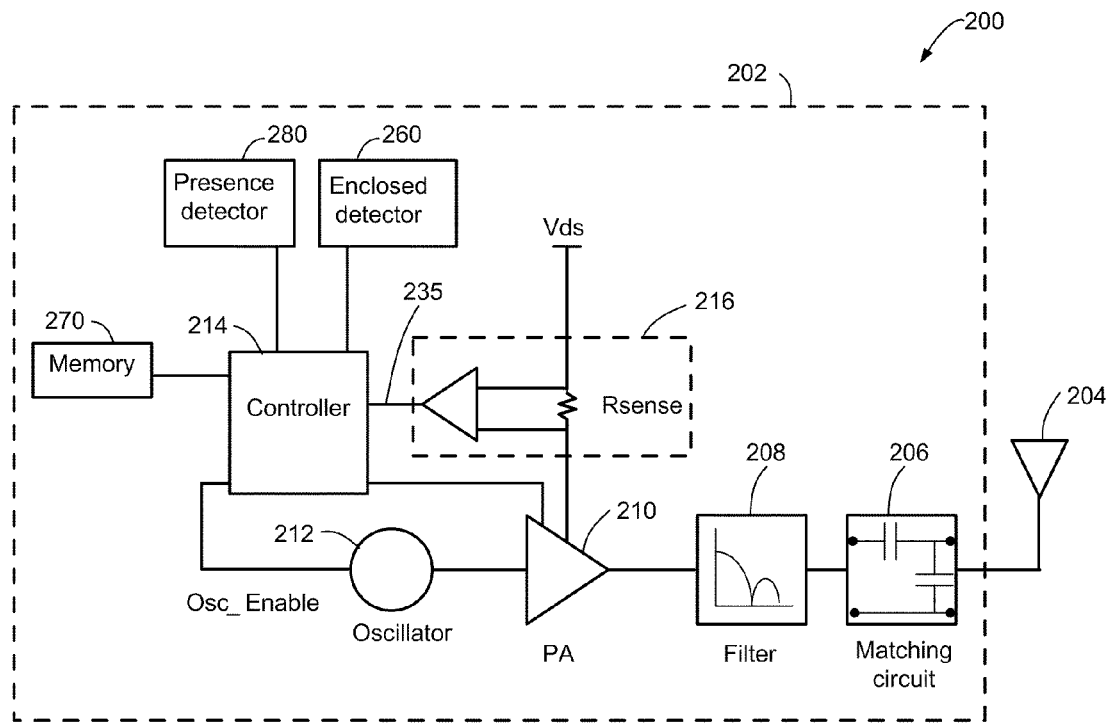
FIG. 4 is a simplified block diagram of a transmitter, in accordance with an exemplary embodiment of the present invention.

FIG. 4 is a simplified block diagram of a transmitter 200, in accordance with an exemplary embodiment of the present invention. The transmitter 200 includes transmit circuitry 202 and a transmit antenna 204. Generally, transmit circuitry 202 provides RF power to the transmit antenna 204 by providing an oscillating signal resulting in generation of near-field energy about the transmit antenna 204. By way of example, transmitter 200 may operate at the 13.56 MHz ISM band.

Exemplary transmit circuitry 202 includes a fixed impedance matching circuit 206 for matching the impedance of the transmit circuitry 202 (e.g., 50 ohms) to the transmit antenna 204 and a low pass filter (LPF) 208 configured to reduce harmonic emissions to levels to prevent self-jamming of devices coupled to receivers 108 (FIG. 1). Other exemplary embodiments may include different filter topologies, including but not limited to, notch filters that attenuate specific frequencies while passing others and may include an adaptive impedance match, that can be varied based on measurable transmit metrics, such as output power to the antenna or DC current draw by the power amplifier. Transmit circuitry 202 further includes a power amplifier 210 configured to drive an RF signal as determined by an oscillator 212 (also referred to herein as a signal generator). The transmit circuitry may be comprised of discrete devices or circuits, or alternately, may be comprised of an integrated assembly. An exemplary RF power output from transmit antenna 204 may be on the order of 2.5 to 8.0 Watts.

Transmit circuitry 202 further includes a controller 214 for enabling the oscillator 212 during transmit phases (or duty cycles) for specific receivers, for adjusting the frequency of the oscillator, for adjusting the output power level, for implementing a communication protocol for interacting with neighboring devices through their attached receivers. The controller 214 is also for determining impedance changes at the transmit antenna 204 due to changes in the coupling-mode region due to receivers placed therein.

The transmit circuitry 202 may further include a load sensing circuit 216 for detecting the presence or absence of active receivers in the vicinity of the near-field generated by transmit antenna 204. By way of example, a load sensing circuit 216 monitors the current flowing to the power amplifier 210, which is affected by the presence or absence of active receivers in the vicinity of the near-field generated by transmit antenna 204. Detection of changes to the loading on the power amplifier 210 are monitored by controller 214 for use in determining whether to enable the oscillator 212 for transmitting energy to communicate with an active receiver.

Transmit antenna 204 may be implemented as an antenna strip with the thickness, width and metal type selected to keep resistive losses low. In a conventional implementation, the transmit antenna 204 can generally be configured for association with a larger structure such as a table, mat, lamp or other less portable configuration. Accordingly, the transmit antenna 204 generally will not need "turns" in order to be of a practical dimension. An exemplary implementation of a transmit antenna 204 may be "electrically small" (i.e., fraction of the wavelength) and tuned to resonate at lower usable frequencies by using capacitors to define the resonant frequency. In an exemplary application where the transmit antenna 204 may be larger in diameter, or length of side if a square loop, (e.g., 0.50 meters) relative to the receive antenna, the transmit antenna 204 will not necessarily need a large number of turns to obtain a reasonable capacitance.

The transmitter 200 may gather and track information about the whereabouts and status of receiver devices that may be associated with the transmitter 200. Thus, the transmitter circuitry 202 may include a presence detector 280, an enclosed detector 260, or a combination thereof, connected to the controller 214 (also referred to as a processor herein). The controller 214 may adjust an amount of power delivered by the amplifier 210 in response to presence signals from the presence detector 280 and the enclosed detector 260. The transmitter may receive power through a number of power sources, such as, for example, an AC-DC converter (not shown) to convert conventional AC power present in a building, a DC-DC converter (not shown) to convert a conventional DC power source to a voltage suitable for the transmitter 200, or directly from a conventional DC power source (not shown).

As a non-limiting example, the presence detector 280 may be a motion detector utilized to sense the initial presence of a device to be charged that is inserted into the coverage area of the transmitter. After detection, the transmitter may be turned on and the RF power received by the device may be used to toggle a switch on the receiver device in a pre-determined manner, which in turn results in changes to the driving point impedance of the transmitter.

As another non-limiting example, the presence detector 280 may be a detector capable of detecting a human, for example, by infrared detection, motion detection, or other suitable means. In some exemplary embodiments, there may be regulations limiting the amount of power that a transmit antenna may transmit at a specific frequency. In some cases, these regulations are meant to protect humans from electromagnetic radiation. However, there may be environments where transmit antennas are placed in areas not occupied by humans, or occupied infrequently by humans, such as, for example, garages, factory floors, shops, and the like. If these environments are free from humans, it may be permissible to increase the power output of the transmit antennas above the normal power restrictions regulations. In other words, the controller 214 may adjust the power output of the transmit antenna 204 to a regulatory level or lower in response to human presence and adjust the power output of the transmit antenna 204 to a level above the regulatory level when a human is outside a regulatory distance from the electromagnetic field of the transmit antenna 204.

As a non-limiting example, the enclosed detector 260 (may also be referred to herein as an enclosed compartment detector or an enclosed space detector) may be a device such as a sense switch for determining when an enclosure is in a closed or open state. When a transmitter is in an enclosure that is in an enclosed state, a power level of the transmitter may be increased.

In exemplary embodiments, a method by which the transmitter 200 does not remain on indefinitely may be used. In this case, the transmitter 200 may be programmed to shut off after a user-determined amount of time. This feature prevents the transmitter 200, notably the power amplifier 210, from running long after the wireless devices in its perimeter are fully charged. This event may be due to the failure of the circuit to detect the signal sent from either the repeater or the receive coil that a device is fully charged. To prevent the transmitter 200 from automatically shutting down if another device is placed in its perimeter, the transmitter 200 automatic shut off feature may be activated only after a set period of lack of motion detected in its perimeter. The user may be able to determine the inactivity time interval, and change it as desired. As a non-limiting example, the time interval may be longer than that needed to fully charge a specific type of wireless device under the assumption of the device being initially fully discharged.

Figure 5:
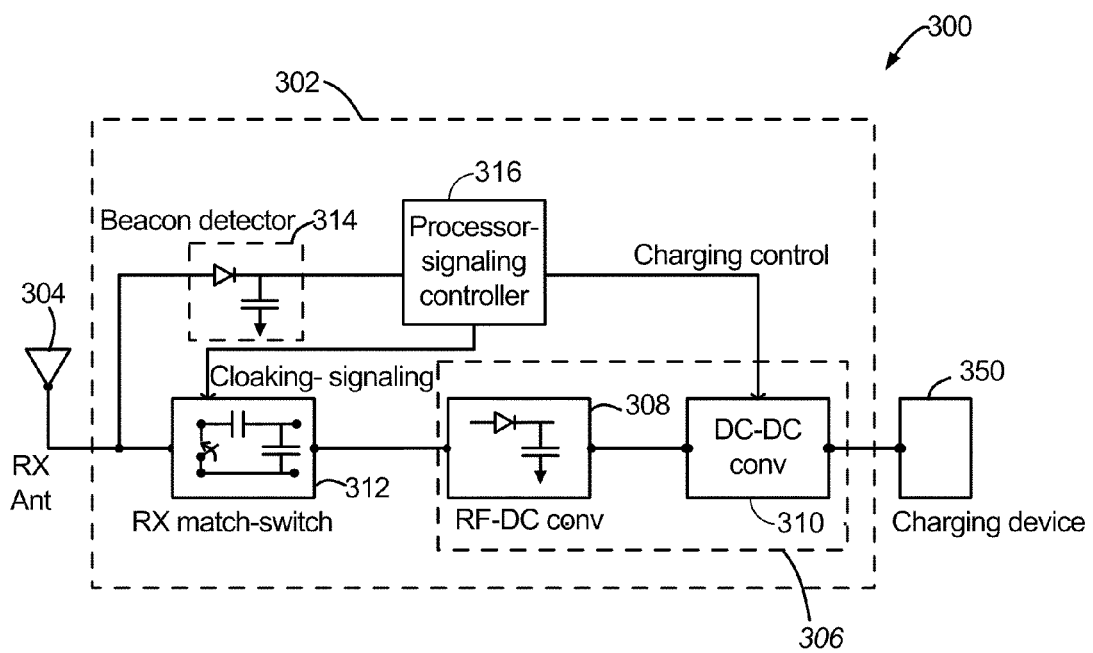
FIG. 5 is a simplified block diagram of a receiver, in accordance with an exemplary embodiment of the present invention.

FIG. 5 is a simplified block diagram of a receiver 300, in accordance with an exemplary embodiment of the present invention. The receiver 300 includes receive circuitry 302 and a receive antenna 304. Receiver 300 further couples to device 350 for providing received power thereto. It should be noted that receiver 300 is illustrated as being external to device 350 but may be integrated into device 350. Generally, energy is propagated wirelessly to receive antenna 304 and then coupled through receive circuitry 302 to device 350.

Receive antenna 304 is tuned to resonate at the same frequency, or near the same frequency, as transmit antenna 204 (FIG. 4). Receive antenna 304 may be similarly dimensioned with transmit antenna 204 or may be differently sized based upon the dimensions of the associated device 350. By way of example, device 350 may be a portable electronic device having diametric or length dimension smaller that the diameter of length of transmit antenna 204. In such an example, receive antenna 304 may be implemented as a multi-turn antenna in order to reduce the capacitance value of a tuning capacitor (not shown) and increase the receive antenna's impedance. By way of example, receive antenna 304 may be placed around the substantial circumference of device 350 in order to maximize the antenna diameter and reduce the number of loop turns (i.e., windings) of the receive antenna and the inter-winding capacitance.

Receive circuitry 302 provides an impedance match to the receive antenna 304. Receive circuitry 302 includes power conversion circuitry 306 for converting a received RF energy source into charging power for use by device 350. Power conversion circuitry 306 includes an RF-to-DC converter 308 and may also in include a DC-to-DC converter 310. RF-to-DC converter 308 rectifies the RF energy signal received at receive antenna 304 into a non-alternating power while DC-to-DC converter 310 converts the rectified RF energy signal into an energy potential (e.g., voltage) that is compatible with device 350. Various RF-to-DC converters are contemplated, including partial and full rectifiers, regulators, bridges, doublers, as well as linear and switching converters.

Receive circuitry 302 may further include switching circuitry 312 for connecting receive antenna 304 to the power conversion circuitry 306 or alternatively for disconnecting the power conversion circuitry 306. Disconnecting receive antenna 304 from power conversion circuitry 306 not only suspends charging of device 350, but also changes the "load" as "seen" by the transmitter 200 (FIG. 2).

As disclosed above, transmitter 200 includes load sensing circuit 216 which detects fluctuations in the bias current provided to transmitter power amplifier 210. Accordingly, transmitter 200 has a mechanism for determining when receivers are present in the transmitter's near-field.

When multiple receivers 300 are present in a transmitter's near-field, it may be desirable to time-multiplex the loading and unloading of one or more receivers to enable other receivers to more efficiently couple to the transmitter. A receiver may also be cloaked in order to eliminate coupling to other nearby receivers or to reduce loading on nearby transmitters. This "unloading" of a receiver is also known herein as a "cloaking" Furthermore, this switching between unloading and loading controlled by receiver 300 and detected by transmitter 200 provides a communication mechanism from receiver 300 to transmitter 200 as is explained more fully below. Additionally, a protocol can be associated with the switching which enables the sending of a message from receiver 300 to transmitter 200. By way of example, a switching speed may be on the order of 100 μsec.

In an exemplary embodiment, communication between the transmitter and the receiver refers to a device sensing and charging control mechanism, rather than conventional two-way communication. In other words, the transmitter uses on/off keying of the transmitted signal to adjust whether energy is available in the near-field. The receivers interpret these changes in energy as a message from the transmitter. From the receiver side, the receiver uses tuning and de-tuning of the receive antenna to adjust how much power is being accepted from the near-field. The transmitter can detect this difference in power used from the near-field and interpret these changes as a message from the receiver.

Receive circuitry 302 may further include signaling detector and beacon circuitry 314 used to identify received energy fluctuations, which may correspond to informational signaling from the transmitter to the receiver. Furthermore, signaling and beacon circuitry 314 may also be used to detect the transmission of a reduced RF signal energy (i.e., a beacon signal) and to rectify the reduced RF signal energy into a nominal power for awakening either un-powered or power-depleted circuits within receive circuitry 302 in order to configure receive circuitry 302 for wireless charging.

Receive circuitry 302 further includes processor 316 for coordinating the processes of receiver 300 described herein including the control of switching circuitry 312 described herein. Cloaking of receiver 300 may also occur upon the occurrence of other events including detection of an external wired charging source (e.g., wall/USB power) providing charging power to device 350. Processor 316, in addition to controlling the cloaking of the receiver, may also monitor beacon circuitry 314 to determine a beacon state and extract messages sent from the transmitter. Processor 316 may also adjust DC-to-DC converter 310 for improved performance.

In some exemplary embodiments, the receive circuitry 320 may signal a power requirement to a transmitter in the form of, for example, desired power level, maximum power level, desired current level, maximum current level, desired voltage level, and maximum voltage level. Based on these levels, and the actual amount of power received from the transmitter, the processor 316 may adjust the operation of the DC-DC converter 310 to regulate its output in the form of adjusting the current level, adjusting the voltage level, or a combination thereof.

Establishing communication link between a transmitter and a receiver may be useful so that charge state information may be relayed from receiver to transmitter, as well as device identification and control information when more than one device is receiving charge at the same time. This communication link should be bi-directional to operate most effectively, as the transmitter may need to send instructions to the receiver, while the receiver unit sends back information in a pre-determined fashion. There are numerous methods for accomplishing this.

A particularly efficient communication method is by in-band transmitter and receiver load modulation which can be sensed by the other device. By in-band, it is meant that the information is exchanged completely within the frequency channel allocated for wireless charging. That is, generally there is no external radio link, operating at a different frequency and radiating the data into free space, is needed. The addition of an external radio link will impact size, cost and complexity of the wireless charging system, and will likely lead to over the air radio transmission and interference issues as well. In-band signaling avoids these problems. In implementing in-band load modulation however, there is a problem of effectively and correctly detecting changes in load impedance. This is particularly true of signaling from the receiver to the transmitter device (reverse link signaling). To ensure that the data being sent is correctly received, a robust method of signal detection is needed.

Signaling in the forward direction (i.e., transmitter to receiver) is straightforward since each device is receiving a large signal from the transmitter. Signaling in the reverse direction (i.e., receiver to transmitter) can be more problematic. Some schemes, such as modulation of receiver impedance, can be used to change Voltage Standing Wave Ratio (VSWR) or reverse loss seen by the transmitter, but detecting the change in transmitter power, voltage, or current can be difficult, since it is often difficult to predict what a given configuration of devices, orientations and receiver designs will do to those parameters. For example, a system where a device causes a change in impedance such that power increases during signaling may change to a decrease if the device is very close to the edge of the coil, or if the device is placed too close to another device. This makes decoding of the reverse signal difficult, if not impossible. Additionally, if the phase alone changes during signaling, magnitude based sense scheme will not work optimally, if at all. Likewise, if the magnitude alone changes during a reverse signaling attempt, and the transmitter detects only a change in phase, detecting the signal will be difficult, if not impossible.

Figure 6A:
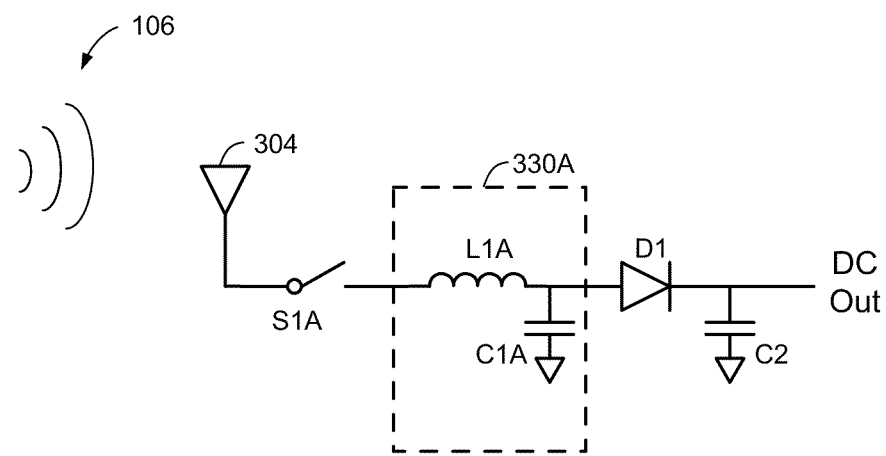
FIGS. 6A and 6B show simplified schematics of portions of receive circuitry for providing reverse-link signaling.
Figure 6B:
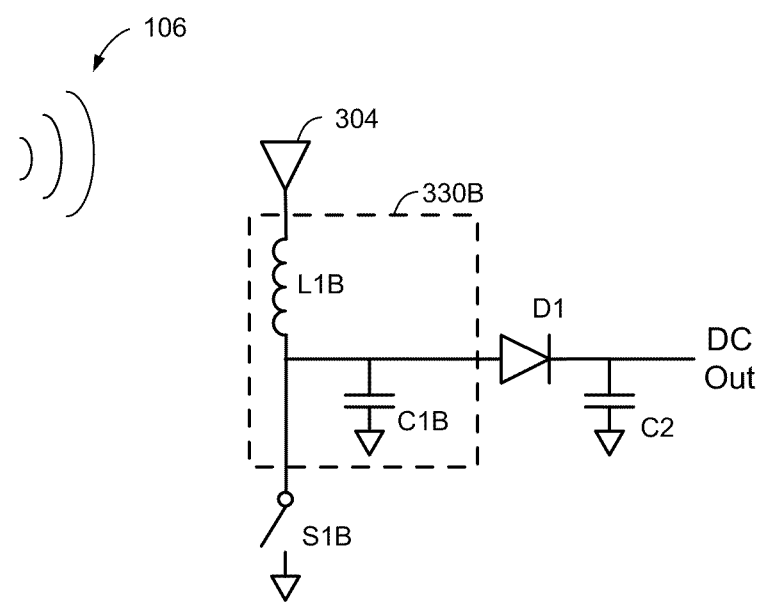

FIGS. 6A and 6B show simplified schematics of a portion of receive circuitry for providing reverse-link signaling. These reverse-link signaling circuits are shown as examples of possible circuits for providing signaling by tuning and de-tuning the receive antenna. Many other circuits for providing the reverse-link signaling to the transmitter by receive antenna tuning are possible and contemplated as within the scope of the present invention.

The circuit in FIG. 6A includes a receive antenna 304, a resonance circuit 330A and a de-tuning switch S1A coupled between the receive antenna 304 and the resonance circuit 330A. The resonance circuit 330A includes an inductor L1A and a capacitor C1A and is configured to resonate at a specific frequency when the de-tuning switch S1A is closed and the receive antenna 304 is excited by electromagnetic radiation at or near the specific frequency.

A diode D1 and a capacitor C2 act as a rectifier to provide a substantially constant DC output signal 309 for providing power to a receiver device (not shown) for charging, powering, or a combination thereof. The receiver can provide reverse-signaling to the transmitter by opening de-tuning switch S1A to de-tune (i.e., cloak) the receive antenna or closing de-tuning switch S1A to tune (i.e., uncloak) the receive antenna.

The circuit in FIG. 6B includes a receive antenna 304, a resonance circuit 330B and a de-tuning switch S1B. The resonance circuit 330A includes an inductor L1B and a capacitor C1B and is configured to resonate at a specific frequency when the de-tuning switch S1B is open and the receive antenna 304 is excited by electromagnetic radiation at or near the specific frequency. The de-tuning switch S1B is coupled between the inductor L1B and the capacitor C1B and coupled to ground such that the resonance circuit is shorted when the de-tuning switch S1B is closed or configured to resonate when the de-tuning switch S1B is open.

A diode D1 and a capacitor C2 act as a rectifier to provide a substantially constant DC output signal 309 for providing power to a receiver device (not shown) for charging, powering, or a combination thereof.

The receiver can provide reverse-signaling to the transmitter by closing de-tuning switch S1B to de-tune (i.e., cloak) the receive antenna or opening de-tuning switch S1B to tune (i.e., uncloak) the receive antenna.

Details of some other exemplary embodiments for cloaking signals, beacon signals, and circuits for generating these signals can be seen in U.S. Utility patent application Ser. No. 12/249,873, entitled "Reverse link signaling via receive antenna impedance modulation" filed on Oct. 10, 2008; in U.S. Utility patent application Ser. No. 12/249,861, entitled "Transmit power control for a wireless charging system" filed on Oct. 10, 2008; and in U.S. Utility patent application Ser. No. 12/249,866 entitled "Signaling charging in wireless power environment" filed on Oct. 10, 2008; all of which are herein incorporated by reference in their entirety.

Figure 7A:
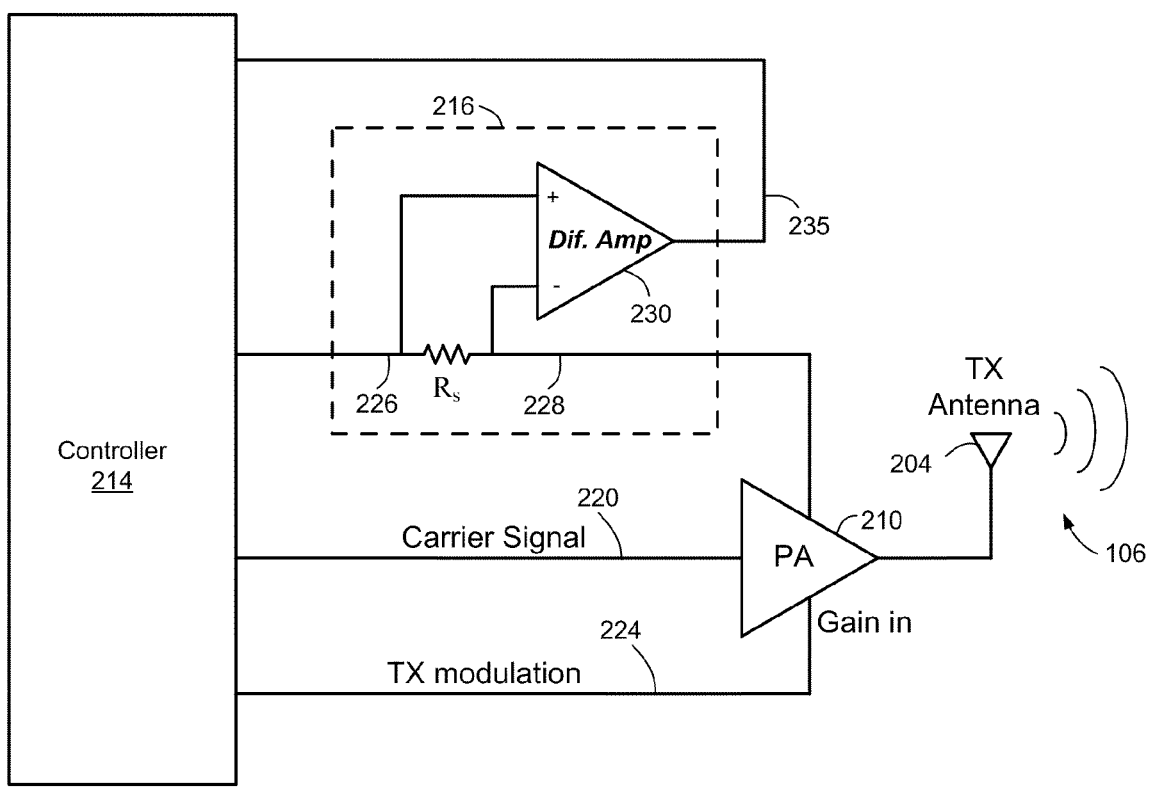
FIGS. 7A-7C shows simplified schematics of portions of transmit circuitry for determining impedance changes at the transmit antenna.
Figure 7B:
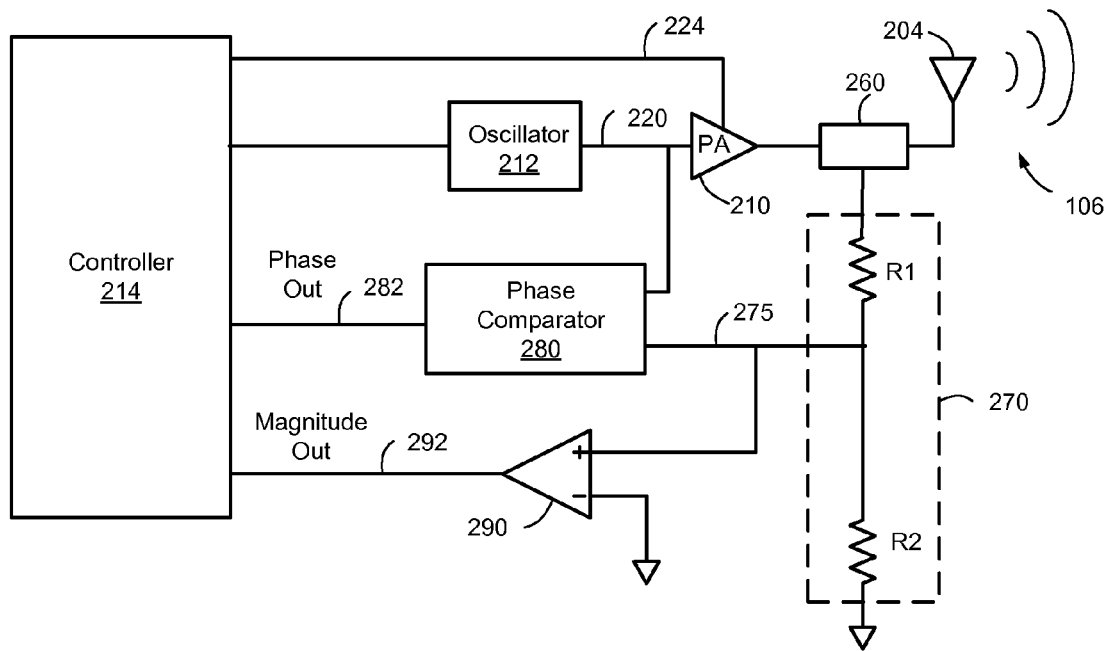
Figure 7C:
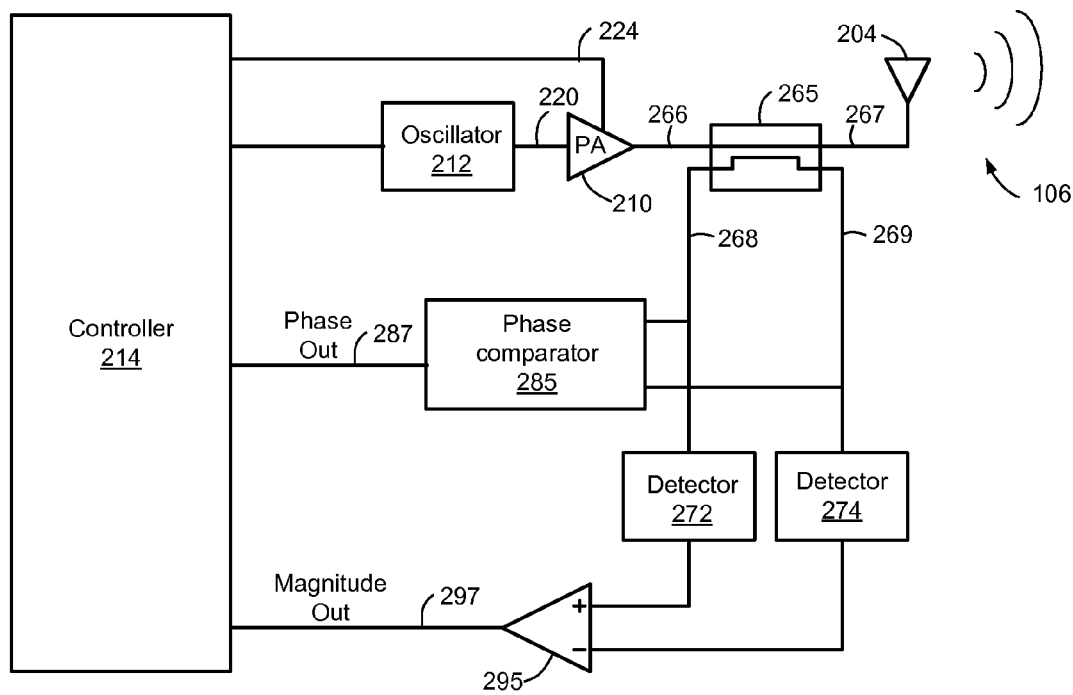

FIGS. 7A-7C show simplified schematics of portions of transmit circuitry for determining impedance changes at the transmit antenna that may be due to reverse link signaling. These impedance changes may be determined due to changes in current delivered to the transmit antenna, changes in phase between a generated signal and a transmitted signal, changes in amplitude between a generated signal and a transmitted signal, or combinations thereof.

FIG. 7A shows a simplified schematic of a portion of transmit circuitry for carrying out messaging between a transmitter and a receiver. In some exemplary embodiments of the present invention, a means for communication may be enabled between the transmitter and the receiver. In FIG. 7A a power amplifier 210 drives the transmit antenna 204 to generate the radiated field 106. The power amplifier is driven by a carrier signal 220 that is oscillating at a desired frequency for the transmit antenna 204. A transmit modulation signal 224 may be used to control the output of the power amplifier 210.

The transmit circuitry can send signals to receivers by using an ON/OFF keying process on the power amplifier 210. In other words, when the transmit modulation signal 224 is asserted, the power amplifier 210 will drive the frequency of the carrier signal 220 out on the transmit antenna 204. When the transmit modulation signal 224 is negated, the power amplifier will not drive out any frequency on the transmit antenna 204.

The transmit circuitry of FIG. 7A also includes a load sensing circuit 216 that supplies power to the power amplifier 210 and generates a receive signal 235 output. In the load sensing circuit 216 a voltage drop across resistor $R_s$ develops between the power in signal 226 and the power supply 228 to the power amplifier 210. Any change in the power consumed by the power amplifier 210 will cause a change in the voltage drop that will be amplified by differential amplifier 230. When the transmit antenna is in coupled mode with a receive antenna in a receiver the amount of current drawn by the power amplifier 210 will change. In other words, if no coupled mode resonance exist for the transmit antenna 210, the power required to drive the radiated field will be a first amount. If a coupled mode resonance exists, the amount of power consumed by the power amplifier 210 will go up because much of the power is being coupled into the receive antenna. Thus, the receive signal 235 can indicate the presence of a receive antenna coupled to the transmit antenna 204 and can also detect signals sent from the receive antenna. Additionally, a change in receiver current draw due to cloaking and uncloaking will be observable in the transmitter's power amplifier current draw, and this change can be used to detect signals from the receive antennas.

The transmit circuitry of FIG. 7A also includes a controller 214 for sampling the receive signal 235 to determine signaling from the receiver based on the differences in current draw by the power amplifier 210, as is explained more fully below.

In FIG. 7B the power amplifier 210 drives a non-directional coupler 260, which drives the transmit antenna 204 to generate the radiated field 106. The power amplifier 210 is driven by a carrier signal 220 (also referred to herein as an RF signal) from on oscillator 212 that is oscillating at a desired frequency for the transmit antenna 204. A transmit modulation signal 224 may be used to control the output of the power amplifier 210.

A reference circuit 270 generates a reference signal correlated to the transmit signal for the transmit antenna 204, but at a lower amplitude similar to that of the input to the power amplifier 210. Thus, the reference circuit may reduce the amplitude, such as by about 25 dB. In the exemplary embodiment of FIG. 7B, the reference circuit 270 is a simple voltage divider including resistor R1 and resistor R2.

The non-directional coupler 260 provides isolation so the reference circuit 270 draws limited power from the transmitted signal and reduces interference with the transmitted signal. A non-directional coupler 260 may be easier to implement that a directional coupler, which is not necessary for the exemplary embodiment of FIG. 7B because there is no need to distinguish between a forward signal and a reverse signal.

The output of the reference circuit 270, reference signal 275, is compared to the RF signal 220 in a phase comparator 280 to determine the phase difference between the two signals. As one possible example, a logic gate may be used for the phase comparison. The phase difference signal 282 is coupled to the controller 214 through an analog-to-digital (A/D) converter, which may be separate (not shown) or integrated with the controller 214.

In an exemplary embodiment, for high end-to-end efficiency (E2EE) in a wireless charging system, it may be desirable to use a high efficiency switching type of power amplifier 210. These power amplifiers (PA) 210 are not necessarily linear type amplifiers, but may be operated essentially as switches driving tuned circuit loads. As such, their input signals are square wave pulse trains, or drive signals that are very nearly so. These input drive signals can be used as a phase reference for a phase comparison signal detection scheme.

Thus, the drive signal to the switching PA 210 is used as a reference, and compared with an isolated transmitter output signal that is reduced in amplitude (i.e., the reference signal 275) so that its level is comparable to that of the RF signal 220, and compares the phase difference between the two signals. As one possible example, the using a logic gate as one possible implementation of phase comparison.

Since the transmit antenna drive signal will vary as the receiver load is varied under load modulation, this variation can be detected by appropriate means on the transmitter side. Notably, it is possible to detect changes in phase in the transmitter drive signal. In an exemplary embodiment the controller 214 may sample the phase difference signal 282 at a rate much faster than the rate of the transmit signal and calculate the distance between successive samples. Thus, a phase change due to a significant change in the receiver's impedance may be determined by the controller 214 to indicate signaling from the receiver device.

In an exemplary embodiment, when a receiver device is not being cloaked, the phase relationship between the drive signal and the transmitter output becomes out of phase, such as by ~10 degrees out of phase. When the receiver load is cloaked, the impedance presented the transmitter output can vary by a noticeable amount. This variation will manifest as a phase change between the RF signal 220 and the references signal 275 when the receiver device is cloaked relative to when the receiver device is uncloaked.

The transmitter may also include a buffer 290 to buffer (and possibly amplify) the reference signal 275. A magnitude signal 292 from the buffer 290 may be coupled to the controller 214 through an analog-to-digital (A/D) converter, which may be separate (not shown) or integrated with the controller 214.

As with the phase difference, since the transmit antenna drive signal will vary as the receiver load is varied under load modulation, this variation can be detected by appropriate means on the transmitter side. Notably, it is possible to detect changes in amplitude in the transmitter drive signal. In an exemplary embodiment the controller 214 may sample the magnitude signal 292 at a rate much faster than the rate of the transmit signal. Thus, a magnitude change due to a significant change in the receiver's impedance may be determined by the controller 214 to indicate signaling from the receiver device.

As explained more fully below, in some exemplary embodiments, the phase change and the magnitude change may be combined in determining signaling from the receiver.

Furthermore, the current change discussed above with reference to FIG. 7A may be included with the phase change and the magnitude change.

In an exemplary embodiment, the wireless charging system can also train itself to learn when a receiver is being load modulated by monitoring the phase and the amplitude at a repetitive rate which should be greater than the signaling rate. Thus averaging may be performed on the signal and the information thus obtained may be stored in memory and be used to compare to the latest incoming data sample. Averaging of signals can be used to reduce error rate.

The exemplary embodiment of FIG. 7B does not require both forward and reflected signal information, along with the attendant directional coupler and forward and reflected amplitude detection circuits. Furthermore, while the amplitude variation on the transmitter drive signal may be used, it is not necessary to do so.

In FIG. 7C the power amplifier 210 drives a directional coupler 265, which drives the transmit antenna 204 to generate the radiated field 106. The power amplifier 210 is driven by a carrier signal 220 (also referred to herein as an RF signal) from on oscillator 212 that is oscillating at a desired frequency for the transmit antenna 204. A transmit modulation signal 224 may be used to control the output of the power amplifier 210.

The directional coupler 265 provides isolation between the input side (between port 266 and port 267) and the isolated side (between port 268 and 269) so the detection circuitry draws limited power from the transmitted signal and reduces interference with the transmitted signal. Thus, the reverse signal is isolated from the forward signal and provides an indication of the reverse signal magnitude and phase.

In some exemplary embodiments, the forward port and reverse port (268 and 269, respectively) on the isolation side may be coupled to detectors (272 and 274, respectively) to change the received RF signal into a DC signals that vary by magnitude. These magnitude signals may be subtracted with a differential amplifier 295 to give a return path loss as magnitude signal 297. The magnitude difference signal 297 is sampled by the controller 214 through an A/D converter, which may be separate (not shown) or integrated with the controller 214.

In other exemplary embodiments, the detectors (272 and 274) may not be present and differential amplifier 295 may compare the RF signals on signals 268 and 269 to determine an magnitude difference signal 297. The controller may sample the magnitude difference signal 297 at a relatively high rate and extract the DC magnitudes using conventional filtering algorithms.

A phase comparator 285 may be coupled to the forward port 268 and the reverse port 269 to determine the phase difference between the forward signal and the reverse signal. As one possible example, a logic gate may be used for the phase comparison. A phase difference signal 287 from the phase comparator 285 is coupled to the controller 214 through an A/D converter, which may be separate (not shown) or integrated with the controller 214. Furthermore, in some exemplary embodiments, a single A/D converter may be shared between the phase difference signal 287 and the magnitude signal 297.

The transmit antenna drive signal will vary as the receiver load is varied under load modulation, this variation can be detected by appropriate means on the transmitter side. Notably, it is possible to detect changes in magnitude and phase of the transmitter drive signal. In an exemplary embodiment the controller 214 may sample the magnitude signal 297 and phase difference signal 287 at a rate much faster than the rate of the transmit signal. Thus, a magnitude change, a phase change, or a combination thereof due to a significant change in the receiver's impedance may be determined by the controller 214 to indicate signaling from the receiver device.

In some exemplary embodiments, the magnitude of the return path loss and the phase difference can thus be translated to two orthogonal axes of a complex impedance plane, and indirectly represent the complex impedance of the load. In an exemplary embodiment, during signaling, a receiver takes an action to substantially change its impedance. This will be reflected in magnitude change, phase change, or combinations thereof. The controller 214 periodically samples the complex impedance of the load, and measures the distance "d" between each consecutive point. In an exemplary embodiment, the distance "d" is calculated via the formula:

$$distance = sqrt((mag1-mag2)^2 + (ph1-ph2)^2)$$

where mag1 and /ph1 are the magnitude and phase of the first measurement, and mag2 and ph2 are the magnitude and phase of the second measurement. When the distance exceeds a threshold for one or more samples, the transmitter will recognize the change as a signal from the receiver. In many wireless power systems, a specific placement of the receiver device in the coupling-mode region may affect the power, magnitude, and phase of the reverse-link signaling as detected by the transmitter.

Figure 8A:
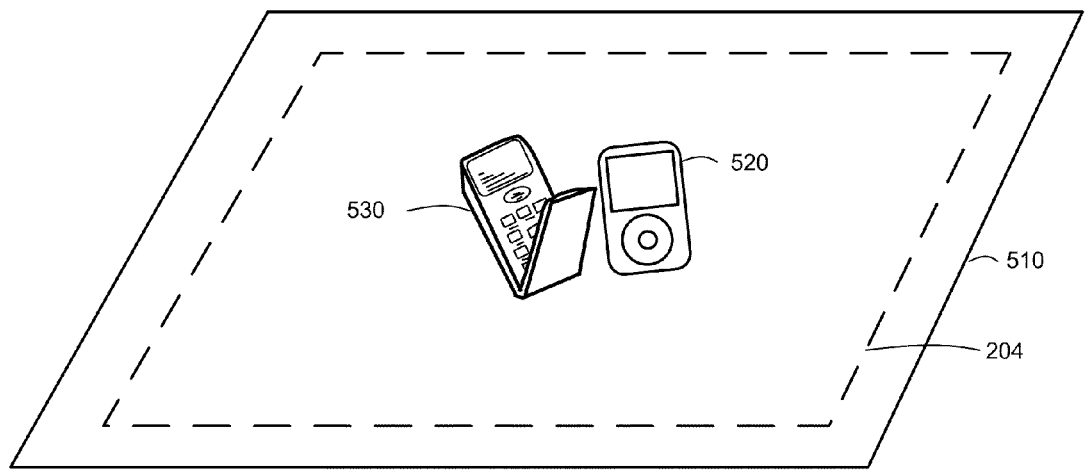
FIGS. 8A-8C illustrate a host device with a transmit antenna and including receivers placed in various positions relative to the transmit antenna.
Figure 8B:
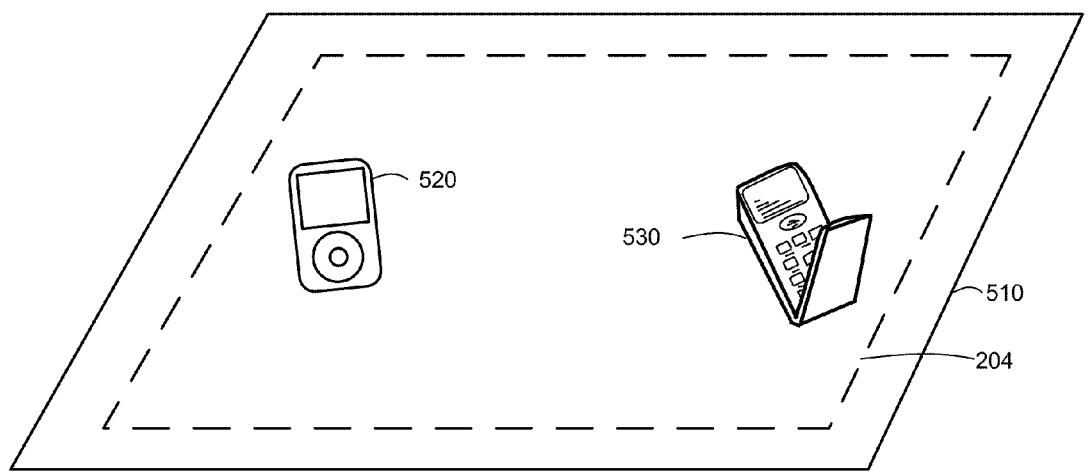
Figure 8C:
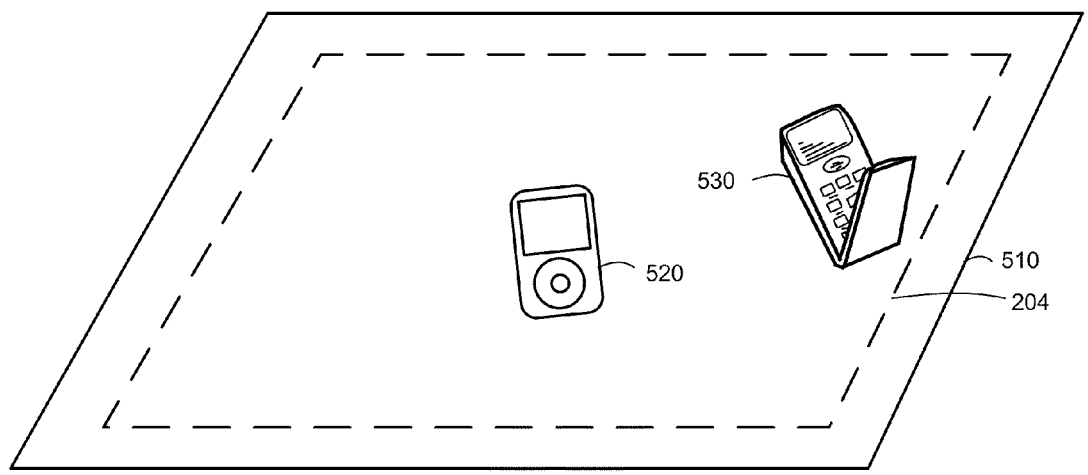

FIG. 8A-8C illustrate a host device 150 with a transmit antenna 204 and includes receiver devices placed in various positions relative to the transmit antenna 204. For simplicity, only two receiver devices are discussed herein but use of multiple devices is also contemplated to be within the scope of the teachings of the disclosure and modification for such would be apparent to a person of ordinary skill in the art.

Receiver devices (520 and 530) are shown placed within the coupling-mode region of the transmit antenna 204. Although not illustrated, the receiver devices (520 and 530) may include receive antennas 304 and receive circuitry 302 as shown in FIG. 5. In FIGS. 8A-8C, the host device 510 is illustrated as a charging mat, but could be integrated into furniture or building elements such as walls, ceilings, and floors. Furthermore, the host device 510 may be an item such as, for example, a handbag, backpack, or briefcase with a transmitter built in. Alternatively, the host device may be a portable transmitter specifically designed for a user to transport and charge receiver devices (520 and 530), such as a charging bag.

"Coplanar," as used herein, means that the transmit antenna and receive antenna have planes that are substantially aligned (i.e., have surface normals pointing in substantially the same direction) and with no distance (or a small distance) between the planes of the transmit antenna and the receive antenna. "Coaxial," as used herein, means that the transmit antenna and receive antenna have planes that are substantially aligned (i.e., have surface normals pointing in substantially the same direction) and the distance between the two planes is not trivial and furthermore, the surface normal of the transmit antenna and the receive antenna lie substantially along the same vector, or the two normals are in echelon.

Coplanar placements may have relatively high coupling efficiencies. However, coupling may vary depending on where the receive antennas are placed relative to the transmit antenna. For example, a coplanar placement point outside of the transmit loop antenna may not couple as efficiently as a coplanar placement point inside the transmit loop. Furthermore, coplanar placement points within the transmit loop, but at different locations relative to the loop, may have different coupling efficiencies.

Coaxial placements may have lower coupling efficiencies. However, coupling efficiencies may be improved with the use of repeater antennas, such as are described in U.S. Utility patent application Ser. No. 12/249,875 entitled "METHOD AND APPARATUS FOR AN ENLARGED WIRELESS CHARGING AREA" filed on Oct. 10, 2008, the contents of which is incorporated by reference herein in its entirety.

FIG. 8A illustrates a scenario where both receiver devices (520 and 530) are positioned substantially symmetrically near a center of the transmit antenna 204, such as by being about the same distance away from the perimeter of the transmit antenna. In FIG. 8B, the receiver devices (520 and 530) are placed away from each other but about the same distance from the perimeter of the transmit antenna 204. FIG. 8C illustrates a scenario wherein the receiver devices (520 and 530) are positioned differently relative to the transmit antenna 204.

With multiple receiver devices, 520 may affect the reverse-link signaling of 530, and vice-versa. Furthermore, the receiver devices 520 and 530 may couple differently to the transmit antenna due to antenna design or placement in the charging area and thus the transmit antenna may detect different amounts of power change, magnitude change, and phase change.

Figure 9A:
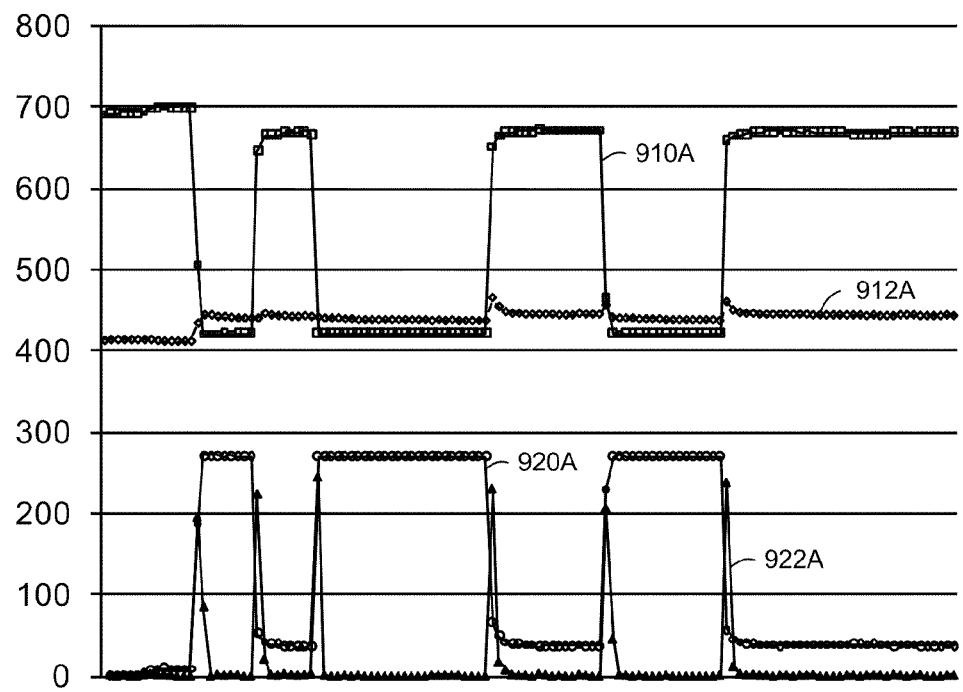
FIGS. 9A-9C are graphs showing impedance characteristics determined at a transmitter responsive to various placements of receivers relative to the transmit antenna.
Figure 9B:
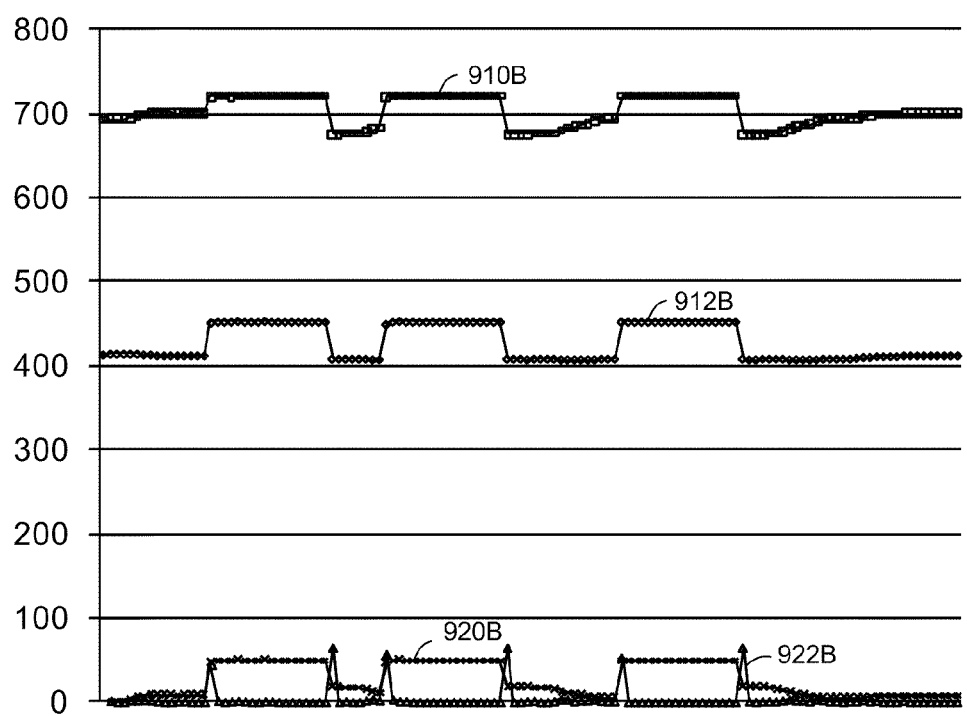
Figure 9C:
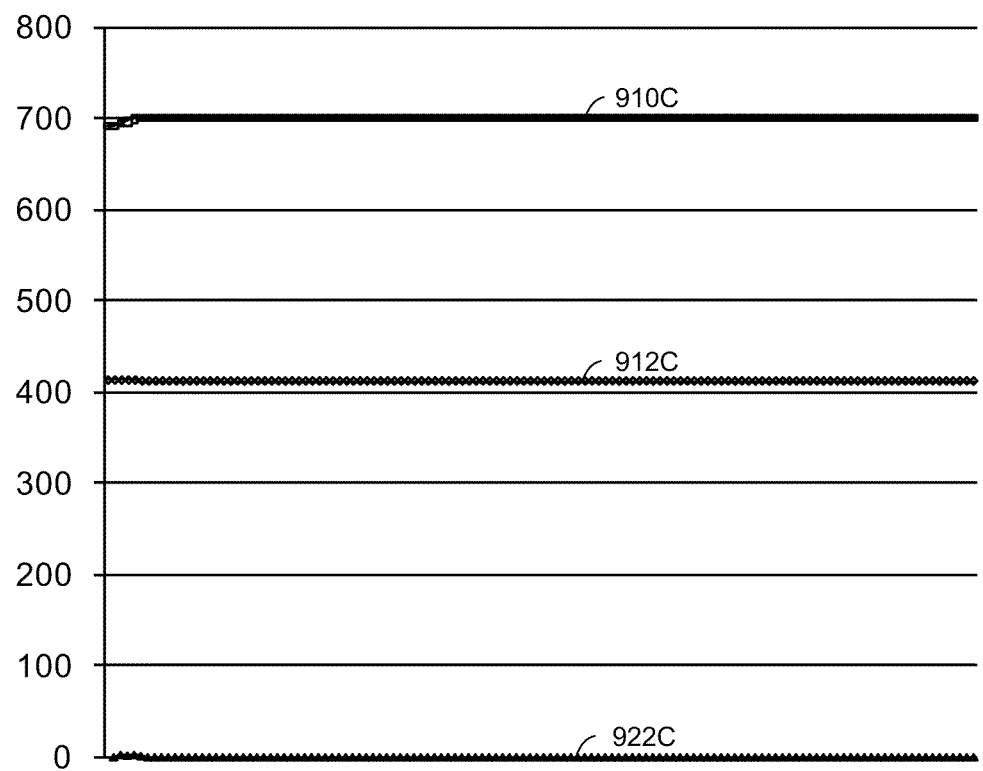

FIGS. 9A-9C are graphs showing impedance characteristics determined at a transmitter responsive to various placements of receivers relative to the transmit antenna. In FIG. 9A, placement of a receiver at a first location, yields a first result when the receiver is reverse-link signaling. Line 910A illustrates the phase difference for the signaling and line 912A illustrates the magnitude difference for the signaling. Line 922A shows a computation of a distance determination as outlined above with respect to FIG. 7C and line 920A shows a delta calculation which is the first derivative of the distance calculation result.

In FIG. 9B, placement of a receiver at a second location, yields a second result when the receiver is reverse-link signaling. Line 910B illustrates the phase difference for the signaling and line 912B illustrates the magnitude difference for the signaling. Line 922B shows a computation of a distance determination as outlined above with respect to FIG. 7C and line 920B shows a delta calculation which is the first derivative of the distance calculation result.

In FIG. 9C, no receiver is reverse-link signaling. As a result Line 910C illustrates a relatively constant phase difference and line 912C illustrates a relatively constant magnitude difference. Line 922C shows a computation of a distance determination, which stays substantially near zero.

Exemplary embodiments of the disclosure reliably identify variations in the magnitude difference, phase difference, and PA current of a transmitter for wireless power transfer where such variations are produced by switching (cloaking) the antenna load of the receiving device being charged. The capability of detecting the antenna load state in the device under charge forms the basis for implementing a binary communication protocol between the device under charge and the transmitter. In fact, the information bits "0" and "1" can be mapped to a load change in the receive antenna which in turn induces a variation in the current and impedance seen at the transmitter.

Exemplary embodiments of the disclosure are directed to a simple yet robust way for demodulating the bits transmitted in the reverse link of coupling-mode region. Several different signals may be used to first identify the most reliable one, and then extract the information bits from the selected signal. Although this particular embodiment is tailored for a differential Manchester encoding protocol, it can be easily modified to operate with other encoding systems as well.

The nature of the wireless charging system makes these variations unpredictable in size and uncorrelated across signals, i.e. while one signal experiences large variation, the other ones may not. Improved decoding of the information bit may be achieved by processing a plurality of these parameters as opposed to a single one.

Exemplary embodiments of the disclosure are directed to reliably detecting a change of the impedance seen at the transmit antenna or a variation of the PA current as a result of the cloaking operation performed at the receiver. The 2 states cloaking (ON), not cloaking (OFF) produce variations in three physical observable quantities: PA current level, magnitude difference and phase difference as seen at the transmit antenna. There are several challenges associated with the detection of these signal variations.

The steady-state value of each of these quantities is not deterministic as it may be a function of the receiver position in the coupling-mode region and other nearby receivers. The variations produced by the cloaking/uncloaking switching may change over time and can be different across signals in a random way. To address these issues, exemplary embodiments of the disclosure utilize multiple signals at the transmitter, specifically PA current, magnitude difference, and phase difference.

In particular the derivative of the above mentioned parameters is computed over time. Given that the derivative of a signal is insensitive to its mean value, the signal's steady-state value is not considered in determining the difference between a "1" or a "0."

Exemplary embodiments of the disclosure identify the most reliable signal source (i.e., the one that experiences the largest variations) and utilize this "preferred" signal to decode the bit stream. The process is divided into 2 stages:
  1) self-synchronization; and
  2) threshold estimation for bit decoding.

Both stages are conducted through observation of training sequences that span the first few bits of the sequence.

The synchronization procedure refers to the correct alignment of the transmit-receive timing such that the initial and ending boundaries of the transmitted bit sequence are correctly identified. In an exemplary embodiment, the synchronization procedure exploits the property of the Manchester code where every bit exhibits a transition in the middle of the bit interval.

Figure 10:
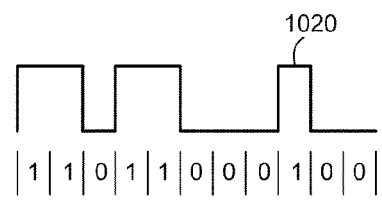
FIG. 10 illustrates a simple binary signaling protocol.

FIG. 10 illustrates a simple binary signaling protocol. In this protocol a "one" is indicated by a high on a signal 1020 and a "zero" is indicated by a low on the signal 1020. With this simple signaling, a long string of zeros or a long string of ones may create long intervals where there are no signal transitions, which may make synchronization between the transmitter and the receiver difficult.

Figure 11:
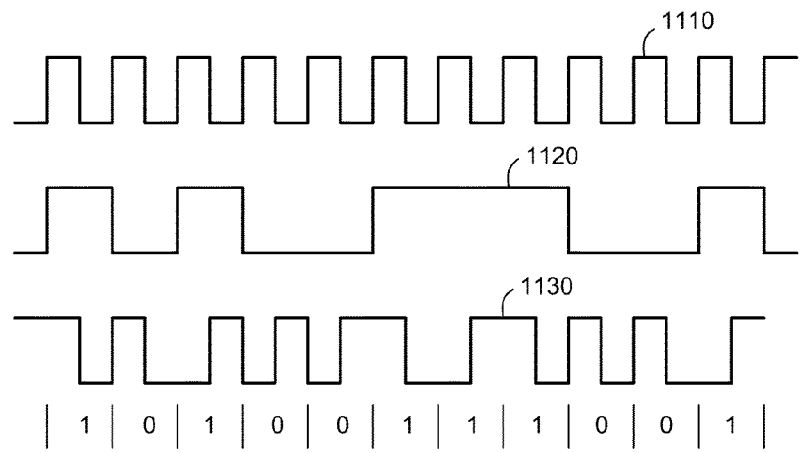
FIG. 11 illustrates a differential Manchester coding protocol.

FIG. 11 illustrates a differential Manchester coding protocol by showing the clock 1110, the data 1120, and the encoded data 1130. Manchester encoding is a synchronous clock encoding technique used to encode the clock and data of a synchronous bit stream and guarantee continuous transitions on the data stream. In this technique, the actual binary data to be transmitted are not sent as a sequence of logic 1's and 0's. Rather, the bits are translated into a slightly different format that has a number of advantages. Differential Manchester encoding uses the presence or absence of transitions to indicate logical values. In many cases, detecting transitions may be less error-prone than detecting high or low levels.

Because only the presence of a transition is important, polarity is not. In other words, differential coding schemes will work the same if the signal is inverted. In FIG. 11, a one bit is indicated by making the first half of the signal equal to the last half of the previous bit's signal (i.e., no transition occurs at the start of the bit-time). A zero bit, on the other hand, is indicated by making the first half of the signal opposite to the last half of the previous bit's signal (i.e., a zero bit is indicated by a transition at the beginning of the bit-time). For both ones and zeroes there is always a transition in the middle of the bit-time, whether from high to low, or low to high.

Thus, in differential Manchester encoding, a one is represented by one transition within a bit time and a zero is represented by two transitions within a bit time. A reversed scheme is possible with a zero represented by the one transition and the one represented by two transitions.

In exemplary embodiments of the present invention, a training sequence at the beginning of a message is used to synchronize and determine the bit boundaries and to determine signal strength for the three different signals. Depending on the embodiment, the training sequence may be a different number of bits and may occur at different intervals. In one exemplary embodiment, each data byte is preceded by a training sequence includes two bits.

Figure 12:
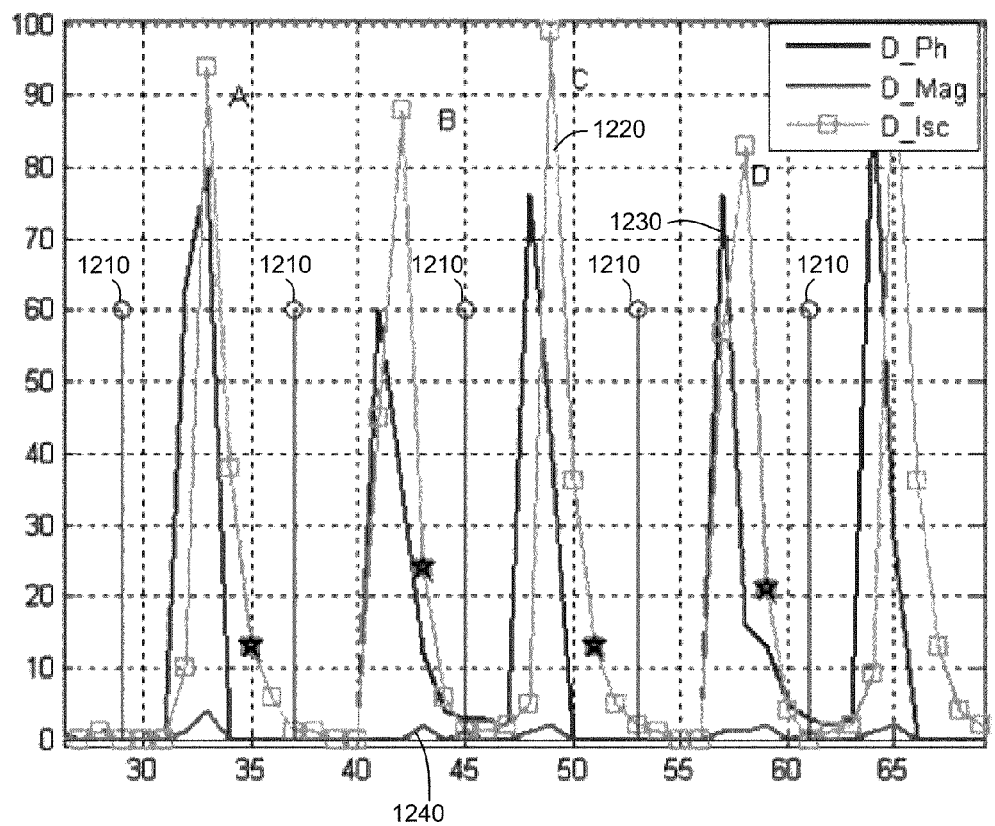
FIG. 12 illustrates differential phase, differential magnitude, and differential current for some example transitions determined by the transmitter.

FIG. 12 illustrates differential phase 1230, differential magnitude 1240, and differential current 1220 for some example transitions during the training sequence determined by the transmitter. These signals are determined by the derivatives of the corresponding sampled signal. As a result, a transition is represented by a peak with a decaying tail. Lines 1210 indicate mid-points between transitions. Thus, as examples only, lines 1210 could be considered as bit boundaries and the transitions shown near the middle of the bit boundaries could be considered as representing a series of four ones with a single transition in the middle of the bit boundary.

Alternatively, lines 1210 may be considered as boundaries between possible transitions. Thus, two consecutive lines 1210 define a bit boundary. In this case, two bits are shown, which may use an alternate encoding where the two bits are represented by ones that include two transitions per bit. Additional details of FIG. 12 are discussed in combination with FIG. 13.

Figure 13:
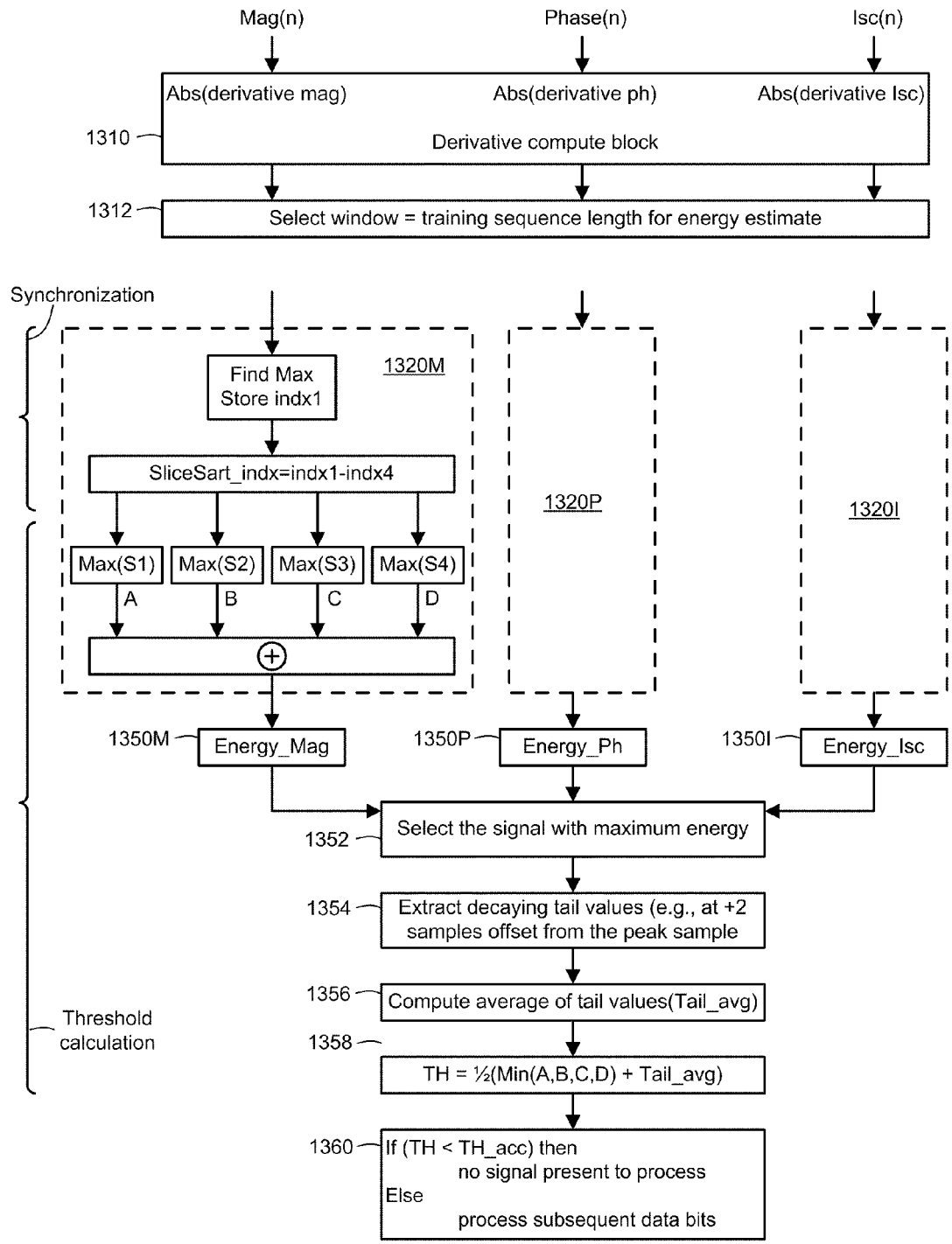
FIG. 13 is a simplified flow diagram of a procedure for determining signaling from a receiver based on impedance changes at the transmitter.

FIG. 13 is a simplified flow diagram of a procedure for determining signaling from a receiver based on impedance changes at the transmitter. A derivative compute block 1310 is used to extract the variations induced in the current, magnitude, and phase represented as $\Delta Isc$ $\Delta mag(Z)$, and $\Delta Ph(Z)$ respectively. Given that for a differential Manchester code the bit information lies in the number of transitions per bit and not on their sign, the magnitude of the derivative may be used for both threshold estimation and the bit period detection process.

Synchronization is achieved in block 1312 by using the equation max {abs[$\Delta Isc$], abs [$\Delta mag(Z)$] abs[$\Delta Ph(Z)$]. Where, the maximum is evaluated over a time span equal to the training sequence.

Each of the differential current, differential magnitude, and differential phase are processed independently in operation blocks 1320M, 1320P, and 1320I, respectively. For clarity, the details of operation blocks 1320P and 1320I are not shown, but are the same as those for operation block 1320M. Once synchronization is achieved, the boundaries of the 4-bit interval, denoted in FIG. 13 as slices (S1, S2, S3, S4), are identified for each signal as represented by lines 1210 in FIG. 12. This slicing operation simplifies the peak search operation as it ensures that there is only one peak in each slice. The energy of each signal is computed as the sum of peaks relative to each slice (e.g., A+B+C+D for the differential current 1220 in FIG. 12). Blocks 1350M, 1350P, and 1350I, show the energy calculation result for each of differential current, differential magnitude, and differential phase, respectively The signal with the highest energy level (e.g., differential current 1220 in FIG. 12) is the one deemed as the most reliable and is selected for detection in block 1352.

An adaptive threshold may be used to discriminate the number of transitions that occur during a bit interval as the width of the variations may change over time. The adaptive threshold may be computed as:

$$TH = \tfrac{1}{2}(A+B+C+D+\text{tail\_avg})$$

where tail_avg=signal amplitude evaluated at an offset from the central peak averaged across the four symbols. In FIG. 12, this offset is defined by the stars as shown on the decaying tail of the differential current 1220. This tail_avg parameter gives an estimate of the lower energy level that can be accepted as a transition. In FIG. 12, the offset is defined as the second sample after the peak sample. However, with other sampling rates, a different sample may be used. Furthermore, the offset level may be defined as a percentage of the peak value, rather than a specific time delay from the peak value. Operation block 1354 indicates the determination of the tail value for each of the four transitions.

Operation block 1356 indicates the computation of the average of the four tail values. In FIG. 12, this average would be the average height of the star points, which is about 17. Operation block 1358 indicates the computation of the adaptive threshold.

Finally, in operation block 1360, the adaptive threshold is compared against an acceptance threshold (TH_acc), which is used to verify that the system is not in a null state where no receiver is actually signaling and a noise only state might be erroneously detected. If the adaptive threshold is less than the acceptance threshold, processing of the signals is stopped and no attempt is made to extract a signal. If the adaptive threshold is greater than or equal to the acceptance threshold, processing continues and the controller extracts the subsequent data bits by comparing the differential values for the selected parameter to the adaptive threshold to determine when a transition has occurred. A transition is defined anytime the differential value exceeds the adaptive threshold.

This procedure is repeated periodically to ensure that at any given point in time, the signal with the highest variation is identified. Consequently, uncertainty about which parameter to use for the detection is resolved.

In summary, two problems with reverse link communications are:
1) Non deterministic, non zero DC signal values are observed for the PA current, magnitude difference, and phase difference; and
2) The parameter variations induced by load switching at the transmitter are uncorrelated across signals and can vary over time.

The exemplary embodiments of the disclosure, based on the absolute derivative, are virtually insensitive to the particular DC offset values of each signal. Furthermore the strongest signal is adaptively identified by simultaneous processing of several parameters. The detection is carried out by comparing the absolute value of its derivative with the adaptive threshold.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the exemplary embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A wireless power transmitter, comprising:
   a transmit antenna comprising a coil configured to transmit power via a magnetic field, the transmit antenna having an impedance that changes in response to a modulation of a load of a receiver;
   a coupler, connected to the transmit antenna, the coupler configured to:
     receive an amplified input signal,
     provide a transmit signal based on the input signal to the transmit antenna, and
     output a first signal comprising at least a portion of the transmit signal, the first signal being isolated from the input signal and the transmit signal;
   a measurement circuit comprising:
     a phase comparator circuit configured to receive the first signal and a second signal and to generate a phase difference signal indicating a phase difference between the first signal and the second signal, the second signal comprising at least a portion of the input signal, the phase difference signal indicative of reverse-link signaling values from the receiver based on changes in the impedance at the transmit antenna caused by the modulation of the load of the receiver, and
     a magnitude measurement circuit configured to receive the first signal and the second signal and to output a magnitude difference signal indicating a magnitude difference between the first signal and the second signal, the magnitude difference further indicative of the reverse-link signaling values; and
   a controller configured to sample the phase difference signal and the magnitude difference signal over a period of time, and to compare at least the phase difference signal with the magnitude difference signal and select the signal with a highest energy level, wherein the controller is configured to determine the reverse-link signaling values based on at least the selected signal.

2. The wireless power transmitter of claim 1, wherein the controller is further configured to determine a distance value comprising a square root of a sum of a square of the phase difference signal and a square of the magnitude difference signal.

3. The wireless power transmitter of claim 1, further comprising:
   an amplifier electrically connected between a signal generator and the coupler; and
   a load sensing circuit electrically connected to the amplifier and configured to detect a change in an amount of power used by the amplifier and to output a power change signal based on the change in the amount of power,
   wherein the controller is further configured to determine signaling values based on changes of the power change signal.

4. The wireless power transmitter of claim 3, wherein the controller is further configured to:
   determine an energy estimate value for each of a derivative of the phase difference signal, a derivative of the magnitude difference signal, and a derivative of the power change signal over the period of time;
   select one of the phase difference signal, the magnitude difference signal and the power change signal with a highest energy estimate value;
   determine a threshold for detecting signaling transitions based on the selected signal; and
   determine the signaling values by comparing subsequent values of the selected signal to the threshold.

5. The wireless power transmitter of claim 4, wherein the controller is further configured to:
   sum values of a plurality of peaks of the selected signal;
   determine an average tail value corresponding to an average of amplitudes of the selected signal at an offset from the plurality of peak values of the selected signal; and
   average the sum of the plurality of peaks with the average tail value.

6. The wireless power transmitter of claim 1, wherein an amount of power of the first signal is less than an amount of power of the transmit signal.

7. The wireless power transmitter of claim 1, wherein the coupler comprises a directional coupler configured to output the second signal, wherein the second signal comprises the at least a portion of the input signal, the second signal being isolated from the transmit signal and the first signal.

8. The wireless power transmitter of claim 7, wherein an amount of power of the second signal is less than an amount of power of the input signal.

9. The wireless power transmitter of claim 1, wherein the coupler comprises a non-directional coupler, and wherein the second signal is received from an oscillator used to generate the input signal.

10. The wireless power transmitter of claim 1, wherein the transmit antenna is configured to output the transmit signal to generate a coupling-mode region.

11. The wireless power transmitter of claim 1, further comprising a signal generator for generating the input signal at a coupling frequency.

12. The wireless power transmitter of claim 1, wherein the signaling values correspond to an information message from a wireless power receiver.

13. The wireless power transmitter of claim 1, wherein the controller is further configured to sample the difference signal over a period of time.

14. A method comprising:
   transmitting power via a magnetic field to a receiver, an impedance of a transmit antenna changing in response to a modulation of a load of a receiver;
   providing a transmit signal based on an amplified input signal to a transmit antenna;
   generating a first signal comprising a portion of the transmit signal, the first signal being isolated from the input signal and the transmit signal;
   generating a phase difference signal indicating a phase difference between the first signal and a second signal, the second signal comprising at least a portion of the input signal, the phase difference signal indicative of reverse-link signaling values from the receiver based on changes in the impedance at the transmit antenna caused by modulation of the load of the receiver;
   generating a magnitude difference signal indicating a magnitude difference between the first signal and the second signal, the magnitude difference further indicative of the reverse-link signaling values;
   sampling the phase difference signal and the magnitude difference signal over a period of time;
   comparing at least the phase difference signal with the magnitude difference signal;
   selecting the signal with a highest energy level; and
   determining the reverse-link signaling values based on at least the selected signal.

15. The method of claim 14, further comprising determining a distance value comprising a square root of a sum of a square of a first value of the phase difference signal and a second value of the square of the magnitude difference signal.

16. The method of claim 14, further comprising:
   generating a power change signal indicating a change in an amount of power used by an amplifier corresponding to a change in a load of the wireless power transmitter; and
   generating signaling values based on changes in the power change signal.

17. The method of claim 16, further comprising:
   determining an energy estimate value for each of a derivative of the phase difference signal over the period of time, a derivative of the magnitude difference signal over the period of time, and a derivative of the power change signal over the period of time;
   selecting one of the phase difference signal, the magnitude difference signal, and the power change signal with the highest energy estimate;
   determining a threshold for detecting signaling transitions based on the selected signal; and
   determining the signaling values by comparing subsequent values of the selected signal to the threshold.

18. The method of claim 17, wherein determining the threshold comprises:
   summing values of a plurality of peaks of the selected signal;
   determining an average tail value corresponding to an average of amplitudes of the selected value at an offset from the plurality of peak values of the selected signal; and
   averaging the sum of the plurality of peaks with the average tail value.

19. The method of claim 14, wherein an amount of power of the first signal is less than an amount of power of the transmit signal.

20. The method of claim 14, further comprising generating the second signal from a portion of the input signal, the second signal being isolated from the transmit signal and the first signal.

21. The method of claim 20, wherein an amount of power of the second signal is less than an amount of power of the input signal.

22. The method of claim 14, wherein the second signal is received from an oscillator used to generate the input signal.

23. The method of claim 14, further comprising outputting the transmit signal to generate a coupling-mode region.

24. The method of claim 14, further comprising generating the input signal at a coupling frequency.

25. The method of claim 14, wherein the signaling values correspond to an information message from a wireless power receiver.

26. The method of claim 14, further comprising sampling the difference signal over the period of time.

27. A wireless power transmitter comprising:
   means for transmitting power via a magnetic field to a receiver, an impedance of the transmitting power means changing in response to a modulation of a load of the receiver;
   means for providing a transmit signal based on an amplified input signal to the transmitting power means;
   means for generating a first signal comprising a portion of the transmit signal, the first signal being isolated from the transmit signal and the input signal used to generate the transmit signal;
   means for generating a phase difference signal indicating a phase difference between the first signal and a second signal, the second signal comprising at least a portion of the input signal, the phase difference signal indicative of reverse-link signaling values from the receiver based on changes in the impedance at the transmitting power means caused by the modulation of the load of the receiver;
   means for generating a magnitude difference signal indicating a magnitude difference between the first signal and the second signal, the magnitude difference further indicative of the reverse-link signaling values;
   means for sampling the phase difference signal and the magnitude difference signal over a period of time;
   means for comparing at least the phase difference signal with the magnitude difference signal;
   means for selecting the signal with a highest energy level; and
   means for determining the reverse-link signaling values based on at least the selected signal.

28. The wireless power transmitter of claim 27, further comprising means for determining a distance value comprising a square root of a sum of a square of a first value of the phase difference signal and a second value of the square of the magnitude difference signal.

29. The wireless power transmitter of claim 27, further comprising:
   means for generating a power change signal indicating a change in an amount of power used by an amplifier corresponding to a change in a load of the wireless power transmitter; and
   means for determining signaling values based on changes in the power change signal.

30. The wireless power transmitter of claim 29, further comprising:
   means for determining an energy estimate value for each of a derivative of the phase difference signal over the period of time, and a derivative of the magnitude difference signal over the period of time, and a derivative of the power change signal over the period of time;

means for selecting one of the phase difference signal, the magnitude difference signal, and the power change signal with the highest energy estimate;

means for determining a threshold for detecting signaling transitions based on the selected signal; and means for determining the signaling values by comparing subsequent values of the selected signal to the threshold.

31. The wireless power transmitter of claim 30, wherein the means for determining the threshold comprises:

means for summing values of a plurality of peaks of the selected signal;

means for determining an average tail value corresponding to an average of amplitudes of the selected value at an offset from the plurality of peak values of the selected signal; and means for averaging the sum of the plurality of peaks with the average tail value.

32. The wireless power transmitter of claim 27, wherein an amount of power of the first signal is less than an amount of power of the transmit signal.

33. The wireless power transmitter of claim 27, further comprising means for generating the second signal comprising a portion of the input signal, the second signal being isolated from the transmit signal and the first signal.

34. The wireless power transmitter of claim 33, wherein an amount of power of the second signal is less than an amount of power of the input signal.

35. The wireless power transmitter of claim 33, wherein the means for generating a first signal comprising a portion of the transmit signal and the means for generating the second signal comprising a portion of the input signal comprise a directional coupler.

36. The wireless power transmitter of claim 27, wherein the means for generating a first signal comprising a portion of the transmit signal comprises a non-directional coupler.

37. The wireless power transmitter of claim 27, wherein the second signal is received from an oscillator used to generate the input signal.

38. The wireless power transmitter of claim 27, further comprising means for outputting the transmit signal to generate a coupling-mode region.

39. The wireless power transmitter of claim 27, further comprising means for generating the input signal at a coupling frequency.

40. The wireless power transmitter of claim 27, wherein the signaling values correspond to a data message from a wireless power receiver.

41. The wireless power transmitter of claim 27, wherein the means for generating a difference signal indicating a difference between a characteristic of the first signal and a corresponding characteristic of the second signal comprises a measurement circuit.

42. The wireless power transmitter of claim 27, the means for determining signaling values based on changes in the difference signal comprises a controller.

43. A wireless power transmitter, comprising: a transmit antenna configured to transmit a transmit signal via a magnetic field to transmit power at a level sufficient to power a receiver;

a transmit circuit configured to generate an input signal to drive the transmit antenna;

a phase comparator circuit configured to determine a phase difference between at least a portion of the transmit signal and at least a portion of the input signal, the phase difference changing in response to modulation of a load of the receiver according to signaling values;

a magnitude measurement circuit configured to determine a magnitude difference between the at least a portion of the transmit signal and the at least a portion of the input signal, the magnitude difference changing in response to modulation of the load of the receiver; and a controller configured to compare at least the phase difference signal with the magnitude difference signal and select the signal with a highest energy level, and to determine a plurality of communication signaling values from the receiver based at least in part on the selected signal.

* * * * *